Figure 1:
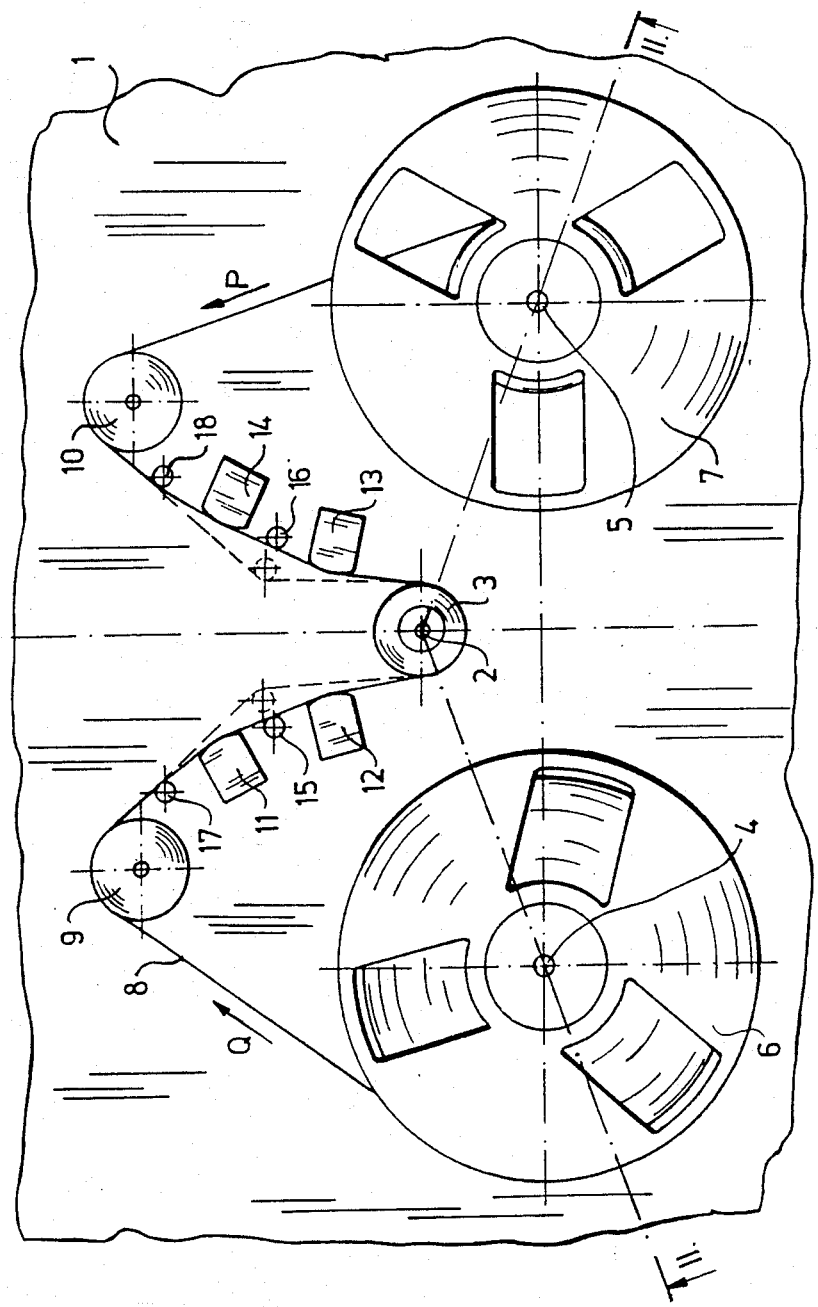

United States Patent [19]

Nagy et al.

[11] Patent Number: 4,877,199
[45] Date of Patent: Oct. 31, 1989

[54] TAPE-CONVEYING SYSTEM FOR FORWARD AND BACKWARD PLAYING MAGNETIC TAPE RECORDER AND/OR PLAY-BACK UNIT

[75] Inventors: Gábor Nagy; György Neumann; Márta Kovács; András Strömpl, all of Budapest, Hungary

[73] Assignee: BRG Mechatronikai Vallalat, Hungary

[21] Appl. No.: 186,958

[22] Filed: Apr. 27, 1988

[51] Int. Cl.<sup>4</sup> ............................................. G11B 15/18
[52] U.S. Cl. .................................... 242/201; 242/208
[58] Field of Search ................................ 242/199-201, 242/206, 208, 209; 360/74.1, 96.3, 96.4

[56] References Cited

U.S. PATENT DOCUMENTS

| | | | |
|---|---|---|---|
| 3,888,432 | 6/1975 | Katoh | 242/201 |
| 3,894,702 | 7/1975 | Okano | 242/208 X |
| 4,009,846 | 3/1977 | Coruzzi | 242/208 X |
| 4,059,245 | 1/1977 | Hirose | 242/201 |

*Primary Examiner*—David Werner
*Attorney, Agent, or Firm*—Handal & Morofsky

[57] ABSTRACT

A tape-conveying system for forward and backward playing magnetic tape recorder and/or playback unit is disclosed a motor (19) driving the magnetic tape (8) at the required speed, a sound shaft (2) interconnected with the motor (19) and fixed through a bearing to a frame (1), a device transmitting movement of the sound shaft (2) to the magnetic tape (8) form a drive mechanism, two winding shafts (4, 5), tape-spindles (6, 7) placed on said winding shafts (4, 5) and winding and unwinding mechanisms connected with the winding shafts, these mechanisms being asynchronous winding clutches (22, 23) and asynchronous unwinding clutches (20, 21) are included in the system. The clothes are interconnected with each winding shaft (4, 5), with the other side of the winding clutches (22, 23) is connected with the driving motor (19). The other side of the unwinding clutches (20, 21) connected with the frame (1), and only one of said connections functions simultaneously on the same winding shaft (4 or 5). With respect of the other winding shaft (5 or 4) the connections are reversed compared with that of the first winding shaft (4 or 5).

17 Claims, 3 Drawing Sheets

TAPE-CONVEYING SYSTEM FOR FORWARD AND BACKWARD PLAYING MAGNETIC TAPE RECORDER AND/OR PLAY-BACK UNIT

The invention relates to a tape transport system, forward and backward playing magnetic tape recorders and/or play-back units. Such a unit may be a multichannel data and signal recorder provided with a motor that drives the magnetic tape at the required speed by turning a sound-shaft, interconnected with the driving motor and fixed through a bearing in the frame of the set. A device transmitting the movement of the sound-shaft to the magnetic tape, two winding shafts, two tape-spindles placed on the shafts, and winding and unwinding mechanisms connected with the winding shafts would be included.

A tape-conveying system has to be used in all forward and backward playing magnetic tape recorders and/or playback units. The main characteristics, and the related various parameters, of such systems are discussed in connection with the multichannel signal recorders. Such sets or systems use spindles loaded with wide, thick magnetic tape, generally longer than 1000 m, the mass of which is around 1 kg. The frequent starting, rapid forward and backward winding, and frequent reversal are characteristic of the operation. The purpose of the tape-conveying system is to perform these functions while keeping the magnetic tape in constantly tight but not overstretched condition. The transient movements should not be transmitted to the magnetic tape, as varying tension furthermore the magnetic tape should not suffer damage even in the case of defects, such as voltage drop out. In the most commonly used systems the problem was solved by using three motors. One is the driving motor, its role is to ensure the required speed of the magnetic tape. The other two motors are associated with the winding shafts, and depending on the momentary operating mode, they produce the stretching, or braking force for winding or unwinding respectively. Their roles include the tape tensioning during accelerations, decelerations and fast winding. Since the operating mode of the motors associated with the two winding shafts is different from that of the driving motor, appropriate control and synchronization between the motors is required. This is not a simple problem, and minor failure of the complicated circuits required for the control and synchronization may lead to faults endangering the integrity of the tape. Additionally, in the case of systems using the three motors, separate mechanisms are needed for fixing the winding shafts of the stationary recorder, for this purpose clutches (brakes) are used. Many known sets are equipped with such tape-conveying systems among them the ICR 20 and ICR 40 of the Racal Recorders Ltd. (Great Britain).

Although recorders with other types of systems are also known, the mentioned type is regarded as the most developed tape recorder. The above invention is aimed at the realization of a tape-conveying system capable of performing the outlined complex functions with a simpler and more reliable construction.

The invention is based on the recognition that the use of a single motor is sufficient, and the requirement for actuating the winding shafts is satisfied with the use of two asynchronous clutches for each shaft and through a driving transmission derived from the motor.

A tape conveying according to the invention was produced for a forward and backward playing magnetic tape recorder and/or play-back unit, provided with a motor driving the magnetic tape at the required speed, a sound-shaft connected with the motor and fixed to the frame through a bearing, a device to transmit movement of the sound-sahft to the magnetic tape, two winding shafts, a tape-spindle to be placed on the winding shafts, winding and unwinding mechanisms connected with the winding shafts, with an asynchronous winding clutch and an asynchronous unwinding clutch representing the mentioned mechanisms interconnected with each winding shaft, wherein the other side of the winding clutches are connected with the driving motor, while the other side of the unwinding clutches are connected with the frame, wherein only one of the connections function on the winding shaft at the same time, and in respect of the other winding shaft, the connections compared with the connection of the first winding shaft are reversed.

Such a mechanism is known as an asynchronous clutch, capable of transmitting torque of specific magnitude, or within a given range, between two rotary shafts even if the speed of the shafts is significantly different (as when one of them is stationary).

In a preferred embodiment of the invention the two asynchronous clutches associated with each winding shaft are formed by a single double-sided asynchronous clutch arrangement. The arrangement is provided with a central disc connecting the winding shaft and two free-wheels of opposite locking direction. The connection with the frame and motor is built up through free-wheels.

In this case it is preferable for the double-sided asynchronous clutch to be formed by a magnetic clutch. In a further preferred embodiment of the system, the locking directions of the free-wheels associated with the two winding shafts are counter to each other. In construction, it is advantageous if the motor shaft and sound-shaft are one and the same, and the sound shaft is fitted with a tape-conveying stub, representing the mentioned transmitting device, partly surrounded by the magnetic tape.

In order to bring about the appropriate transmissions and connection, the driving motor is engaged through a mechanism with gears fixed to the winding clutches Unless a double-sided automatic asynchrnous clutch is used, the appropriate clutch has to be installed in place of the other one. For this purpose a common connection and release control mechanism is connected with the asynchronous clutches associated with each winding shaft.

The problem is solved in a simple way by the tape-conveying system according to the invention ensuring the tightness of the tape under any operational and non-operational condition, and it is realizable at a cost much lower than that of the customary systems.

Figure 2:
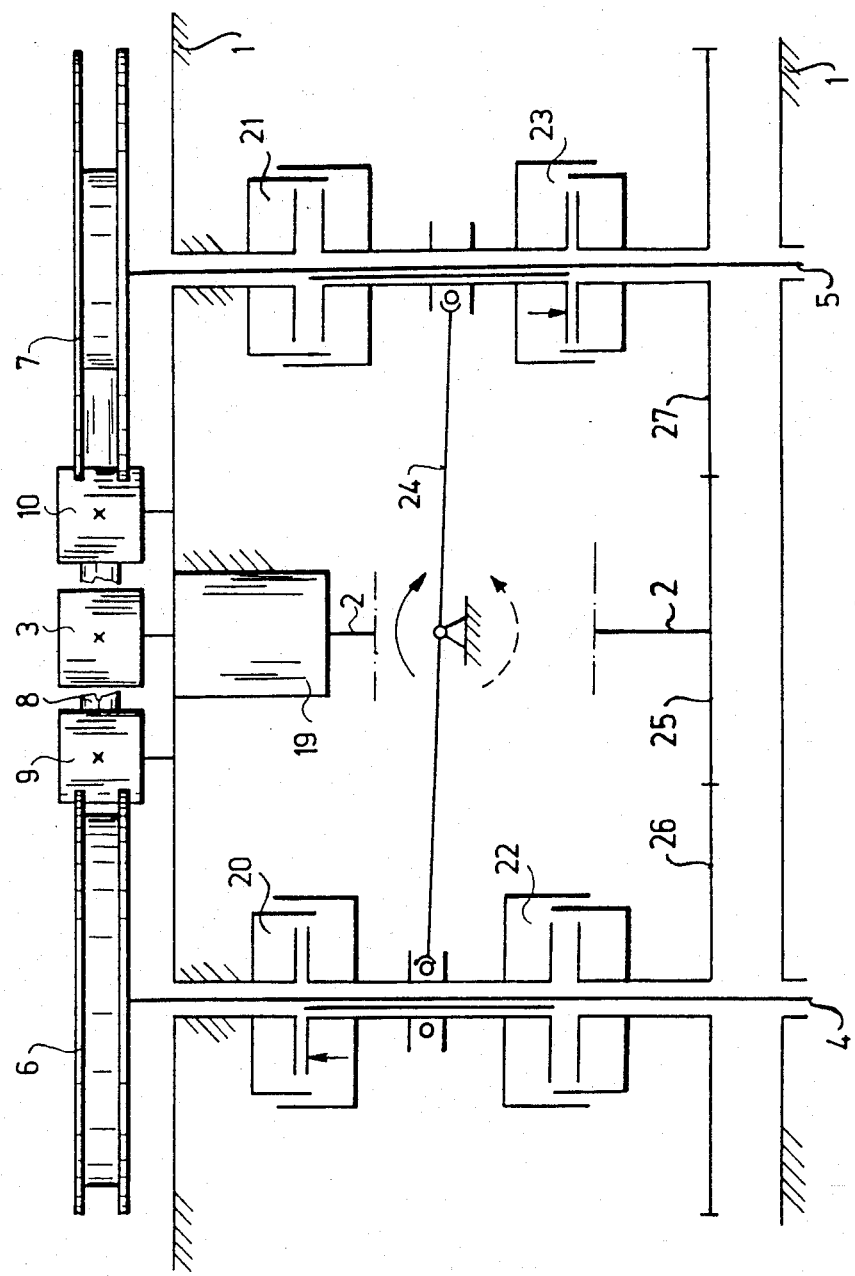
Figure 3:
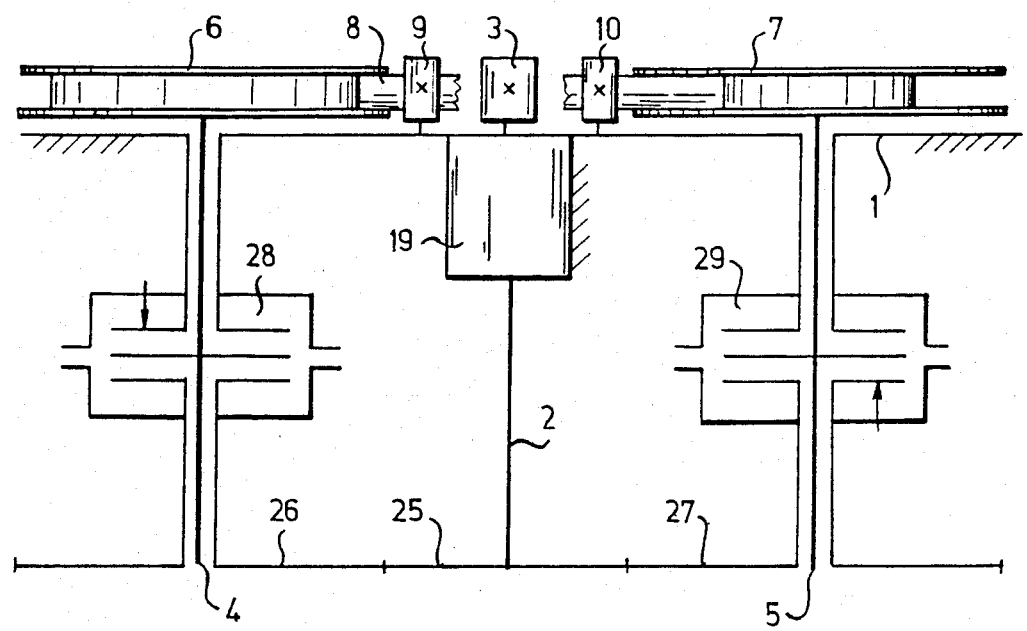
Figure 4:
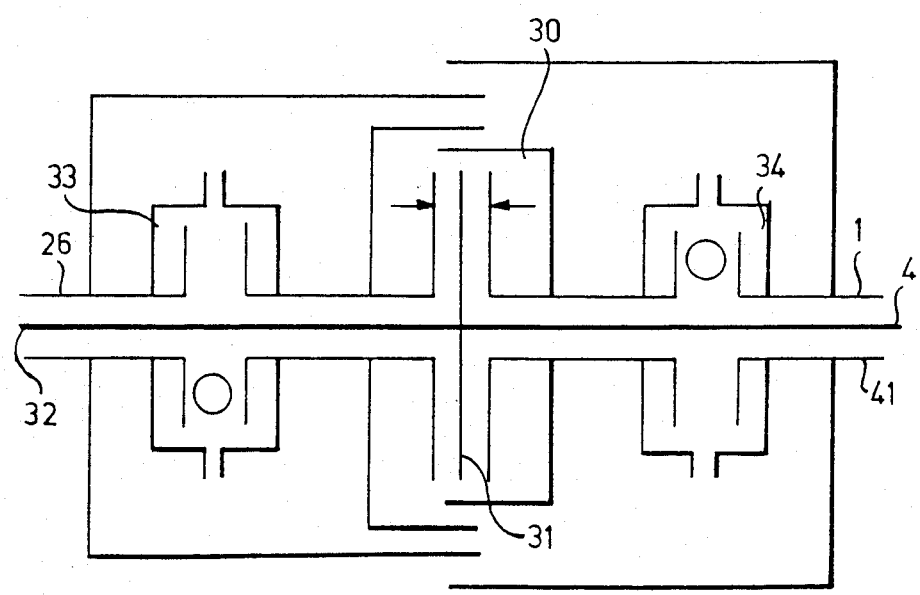

The invention is described in detail by way of examples with the aid of drawings, in which:

FIG. 1 shows a simplified top view of the set containing the tape-conveying system according to the invention, FIG. 2 shows a section along II—II shown in FIG. 1, FIG. 3 shows a sectional view similar to FIG. 2, illustrating another simplified embodiment, FIG. 4 shows a general arrangement of the double-sided clutch presented in FIG. 3.

A tape-conveying system as shown in FIG. 1, is arranged on frame 1 of the tape recorder. The central element of the system is represented by the motor-driven sound shaft 2 perpendicular to the frame 1 and fixed to it through bearing. A tape-conveying stub 3 is situated at the outer end of sound shaft 2 and forms a contact area of approximately 180° with the tape path, wherein a tape 8 is in contact with stub 3.

Two winding shafts 4 and 5, parallel with the sound shaft 2 and fitted with bearings and tape-spindles 6 and 7, are arranged on frame 1. Magnetic tape 8 is arranged on spindles 6 and 7 and its path is determined by guiding rollers 9 and 10 and tape conveying stub 3. Erasing, recording and playing heads 11, 12, 13, and 14, respectively, are arranged along the path. For fast winding, tape-lifting rollers 15, 16 are situated along the path for protecting the heads. The rollers are moved by a control mechanism to a position marked by dashed line, wherein the path bypasses the heads 11 to 14. Tape cleaning elements 17 and 18 are also positioned along the path.

Control and driving elements arranged below the frame 1 are shown in FIG. 2. The sound shaft 2 is connected directly with a suitably constructed driving motor 19 rotatable to the right and left, and its speed is variable with a respective control.

Sensing regulating and actuating elements used for adjusting its operating speed are not shown, as these do not come within the subject of the invention.

Two asynchronous clutches are situated on each winding shaft 4 and 5. One of the two asynchronous clutches associated with each winding shaft stretches the tape upon winding, and the other one upon unwinding. The magnetic tape 8 is moved in both directions, hence both functions are required for both winding shafts.

An unwinding clutch 20 and a winding clutch 22 are arranged on the winding shaft 4, and an unwinding clutch 21 and a winding clutch 23 on the winding shaft 5.

One connection of the unwinding clutches 20 and 21 is engaged with frame 1, while the other is engaged with winding shafts 4 and 5 respectively, and the latter connection can be brought about or released by engaging one clutch with one winding shaft at one time. One end of each winding clutch 22 and 23 is similarly releasably engaged with winding shafts 4 and 5 respectively, so that only one clutch can be interconnected with one winding shaft at one time. The other end of each winding clutches 22 and 23 is engaged through gears 26 and 27 with gear 25 mounted at the lower end of the sound shaft 2.

As mentioned before, the winding and unwinding clutches 20, 21, 22, 23 are engaged alternately, when the magnetic tape moves in the direction P shown in FIG. 1, the winding clutch 22 is engaged with said winding shaft 4 and the unwinding clutch 21 with winding said shaft 5, and engagements of the other two clutches are released. When the magnetic tape 8 moves in the opposite direction Q, the unwinding clutch 20 is engaged with the winding shaft 4 and the winding clutch 23 with said winding shaft 5, whereas engagement of the other two clutches is released. This is controlled by an actuator 24, here, a tipping-shifting mechanism, which is in turn controlled by the direction of the motor 19.

The asynchronous clutches are formed to effect braking (or driving) torque between the two sides independent of or only slightly dependent on the speed difference. The connection is not sufficiently firm to synchronize the sides of the clutch to one another. Such a clutch can be developed from a friction clutch, however the use of a magnetic clutch is preferable. In a magnetic clutch one half of the clutch is formed by multi-pole ring consisting of magnets opposite a magnetizable disc forming the other half. The magnetic field is perpendicular to the air gap and its sense varies according to the poles.

FIG. 3 is similar to the arrangement shown in FIG. 2, but here the two asynchronous clutches used for each winding shaft are replaced by double-sided clutches 28, 29, the structure thereof is presented in FIG. 4. Such a clutch arrangement performs the winding and unwinding functions automatically without the need of actuating mechanism 24, since its engagement depends on the driving direction. Naturally the arrangement in FIG. 3 is smaller and more favorable than the one shown in FIG. 2.

The middle part of the clutch arrangement shown in FIG. 4 is formed by a double-sided asynchronous clutch 30 comprising a central disc 31 which is interconnected with an internal shaft 32. Each side of the clutch 30 is engaged with a free-wheel 33 and 34 respectively, and their locking direction is counter to each other. Said free-wheel 33 is engaged toward driving motor 19, and said free-wheel 34 toward frame 1. Each side of the clutch 30 is formed by a magnetic disc and the central disc 31 by a ring consisting of magnetic poles, which during rotation carries along and drives the opposite disc with torque. Operation of the tape-conveying system according to the invention is the following:

When magnetic tape 8 moves in the direction of arrow Q, its speed is determined by the speed of the driving shaft 2, since the tape-conveying stub 3 on the shaft is surrounded by the magnetic tape 8 resulting in slip-free engagement between them. The transmission of gears 25, 26 and 27 rotate the respective winding shafts at a speed which would result in a higher speed of the tape, than the one fixed by the tape-conveying stub 3. In this example, using the embodiment of FIG. 2, gear 27 is engaged with winding shaft 5 through winding clutch 23. The tape-spindle 7 tensions the magnetic tape 8, and the continuous stretching force is maintained by the torque transmitted through the winding clutch 23. The other winding shaft 4 is engaged with the unwinding clutch 20 connected to the frame 1, trying to stop it. However, the magnetic tape 8 is pulled by the tape-conveying stub 3. The torque of unwinding clutch 20 the tape, hence it remains sufficiently tight between the tape-spindle 6 and tape conveying stub 3. The conditions remain the same upon quick winding, transmission of the gears 25, 27 takes care of the stretching. Correct dimensioning of the clutches results in keeping the braking and stretching torque just at the required value in the operating speed range. Use of the clutches is efficient even in case of stationary spindles, accelerations or decelerations, thus the transient movements do not result in slackening or detrimental overstretching of the tape.

In reverse actuation, the roles of winding shafts 4 and 5 are interchanged, and the clutches appropriate for the new direction are engaged.

The solution presented in FIGS. 3 and 4 is more favorable in that the free-wheel 33 locks upon winding, and it engages the winding side of the clutch 30 (motor and winding shaft engagement) in this case the freely rotating free-wheel fixed towards the frame is not able to transmit torque. In case of tape transport in the opposite direction free-wheel 34 locks and engages the unwinding side of the clutch 30 (frame and winding shaft engagement), and the freely rotating free-wheel 33 towards the motor is not able to transmit torque. Due to the operation, the locking direction of the free-wheels in the double-sided clutch arrangements 28 and 29 are counter to each other, consequently when winding occurs on one side, the other side is in unwinding operating mode.

The same operational conditions are valid for the embodiment shown in FIGS. 3 and 4 as in the case presented in FIG. 2.

Although such examples were presented in the drawing where the driving motor 19 includes the sound shaft 2, or the latter one is connected through gears with the respective clutch, it is easy to realize, that in place of the gear, any other transmission, such as a belt-drive, can also be used. Additionally the driving motor 19 may be connected through some kind of transmission with the sound shaft 2. However, these structural details do not influence the described operation of the invented system.

When using a multi-channel magnetic tape data and event recorder, the system according to the invention has many advantages resulting in improved tape safety under both normal operational and irregular circumstances.

The operation of such sets involves frequent starting, deceleration, rapid forward and backward winding, reversal of direction. Using DC motors all these functions can be accomplished with the intensity and polarity of the voltage applied to the terminals of the driving motor 19, without any further intervention or control. This feature considerably simplifies the control. Deceleration of the tape movement can be accomplished with countervoltage applied to the motor terminals. After stopping of the tape, a separate fixing brake is unnecessary, because the asynchronous clutches apply torque even in stationary position which is equivalent to the operational tape tensioning. This torque is provided even if the set is without supply voltage. If under irregular circumstances the supply voltage fails during operation, the unpowered system will slow down, while maintaining the operational tape tensioning, thus the tape and the set will not be endangered. In the case of rapid winding in a conventional tape-conveying system, a sudden braking and the ceased drive of the rotating spindle, great amass and inertia, would lead to or overstretching of the tape, which are eliminated in the system according to the invention.

The improved reliability of the system is due to the feature that it has no part deliberately exposed to wear, and life expectancy of a magnetic asynchronous clutch is practically unlimited.

As a result of the simplified construction, the losses due to friction and a multiplicity of gears appearing in the drive are eliminated or minimal, hence the power consumption of the system is also minimal. In respect of the cost of production, the use of a single motor instead of the customary three motors represent further substantial saving.

We claim:

1. A tape transport system comprising:
   (a) a frame;
   (b) a variable speed, reversible drive mechanism comprising a motor;
   (c) two winding shafts;
   (d) a winding clutch associated with each of said winding shafts;
   (e) a secondary mechanism that connects each winding clutch with said drive mechanism;
   (f) an unwinding clutch associated with each of said winding shafts, each of said unwinding clutches connected to said frame; and
   (g) an actuation means, said actuation means engaging one winding clutch and one unwinding clutch, wherein the two engaged clutches are each on a different winding shaft, or alternately the opposite such pair and wherein the clutch engagements are such that the motions, if any, of the winding shafts are compatible with the motions, if any, of the drive mechanism so as to provide proper tape tensioning.

2. A tape-transport system as claimed in claim 1, wherein each pair of clutches, one winding clutch and one unwinding clutch, associated with each winding shaft, form a double-sided clutch arrangement.

3. A tape transport system as claimed in claim 2 wherein each of said double-sided clutch arrangements comprise:
   (a) a central disk connected with said winding shaft; and
   (b) a pair of free-wheels with opposite locking directions.

4. A tape transport system as claimed in claim 3, wherein said double-sided clutch arrangement comprises a magnetic clutch.

5. A tape transport system as claimed in claim 1, wherein said drive mechanism is provided with a cylindrical tape-conveying stub designed to contact tape over a part of said stub's circumference.

6. A tape transport system as claimed in claim 1, wherein said secondary mechanism comprises a gear attached to said drive mechanism and further gears, one of said further gears affixed to the winding clutch of one winding shaft and another of said further gears affixed to the winding clutch of the other winding shaft.

7. A tape transport system as claimed in claim 1, wherein said actuation means comprises an actuating device that alternately engages said winding and unwinding clutch pairs, engages one such pair at a time in response to the direction of movement of the drive mechanism.

8. A tape transport system comprising:
   (a) a frame;
   (b) a variable speed, reversible drive mechanism comprising:
      (i) a variable speed, reversible DC motor;
      (ii) a sound-shaft, and
      (iii) means to translate a rotation of said shaft into movement of a tape;
   (c) two winding shafts;
   (d) an asynchronous winding clutch associated with each of said winding shafts;
   (e) a secondary mechanism that connects each asynchronous winding clutch with said sound-shaft;
   (f) an asynchronous unwinding clutch associated with each of said winding shafts each of said asynchronous unwinding clutches connected to said frame; and
   (g) an actuation means, said actuation means engaging one winding clutch and one unwinding clutch, wherein the two engaged clutches are each on a different winding shaft, or alternately the opposite such pair and wherein the clutch engagments are such that the motions, if any, of the winding shafts are compatible with the motions, if any, of the sound-shaft so as to provide movement, if any, of the tape in the desired direction and proper tape tensioning.

9. A tape-transport system as claimed in claim 8, wherein each pair of asynchronous clutches, one winding clutch and one unwinding clutch, associated with each winding shaft, form a double-sided asynchronous clutch arrangement.

10. A tape transport system as claimed in claim 9 wherein each of said double-sided asynchronous clutch arrangements comprise:
(a) a central disk connected with said winding shaft; and
(b) a pair of free-wheels with opposite locking directions.

11. A tape transport system as claimed in claim 9, wherein said double-sided asynchronous clutch arrangement comprises a magnetic clutch.

12. A tape transport system as claimed in claim 8, wherein said sound-shaft is provided with a cylindrical tape-conveying stub designed to contact tape over a part of said stub's circumference.

13. A tape transport system as claimed in claim 12, wherein said sound-shaft comprises two parts, one connected to said tape-conveying stub, the other connected to said secondary mechanism.

14. A tape transport system as claimed in claim 8, wherein said secondary mechanism comprises a gear attached to said drive mechanism and further gears, one of said further gears affixed to the asynchronous winding clutch of one winding shaft and another of said further gears affixed to the asynchronous winding clutch of the other winding shaft.

15. A tape transport system as claimed in claim 14, wherein said gear attached to said drive mechanism is attached to said drive mechanism at said sound-shaft.

16. A tape transport system as claimed in claim 8, wherein said actuation means comprises an actuating device that alternately engages said asynchronous winding and unwinding clutch pairs engages one such pair at a time in response to the direction of movement of the drive mechanism.

17. A tape transport system as claimed in claim 14, wherein said further gears comprise only two gears each of which communicates with said gear attached to said drive mechanism.

* * * * *